May 3, 1960 E. P. HARRIS 2,935,003
APPARATUS FOR MAKING TUBING
Filed Feb. 13, 1956 2 Sheets-Sheet 1
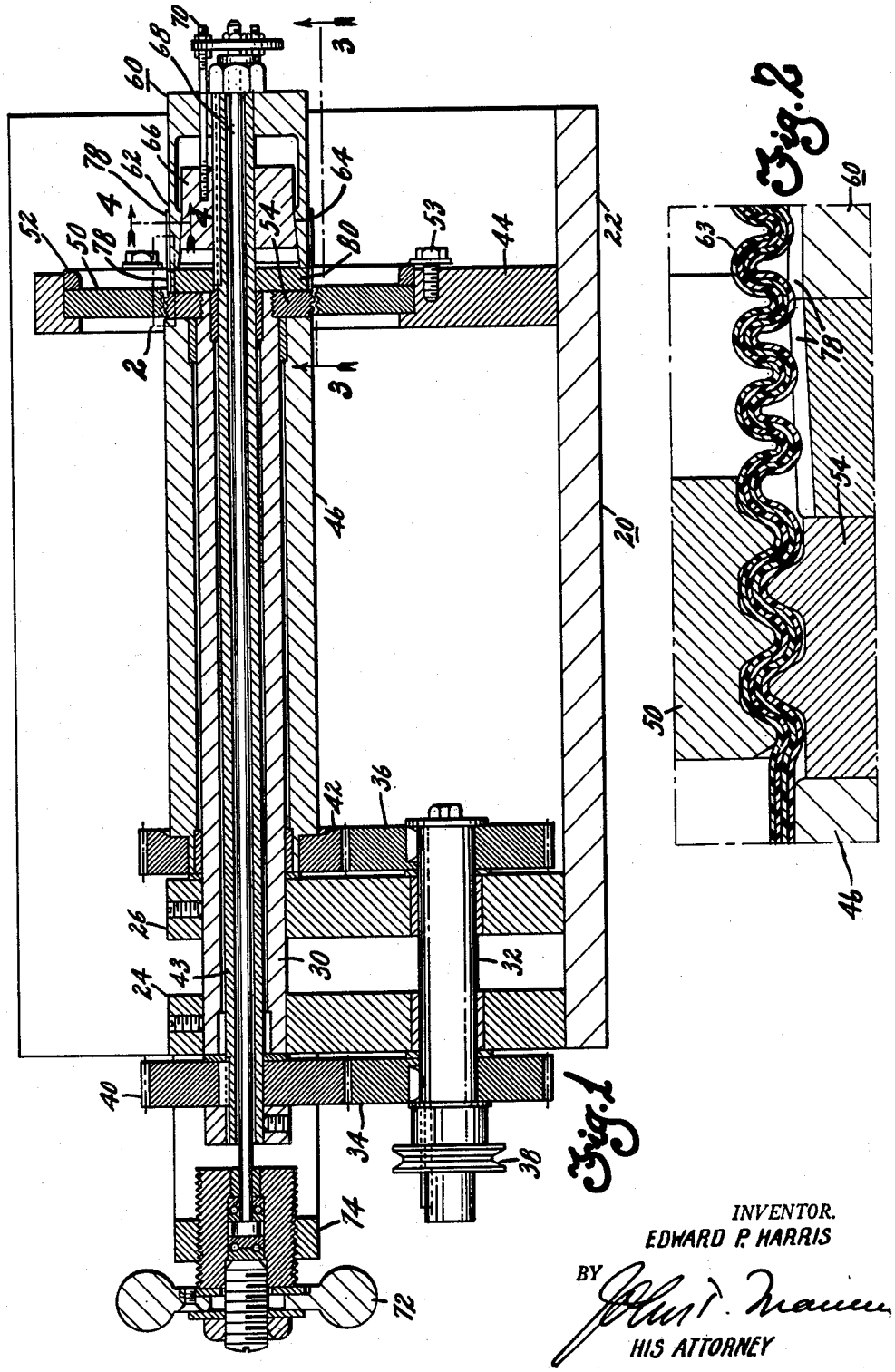
INVENTOR.
EDWARD P. HARRIS
BY
HIS ATTORNEY

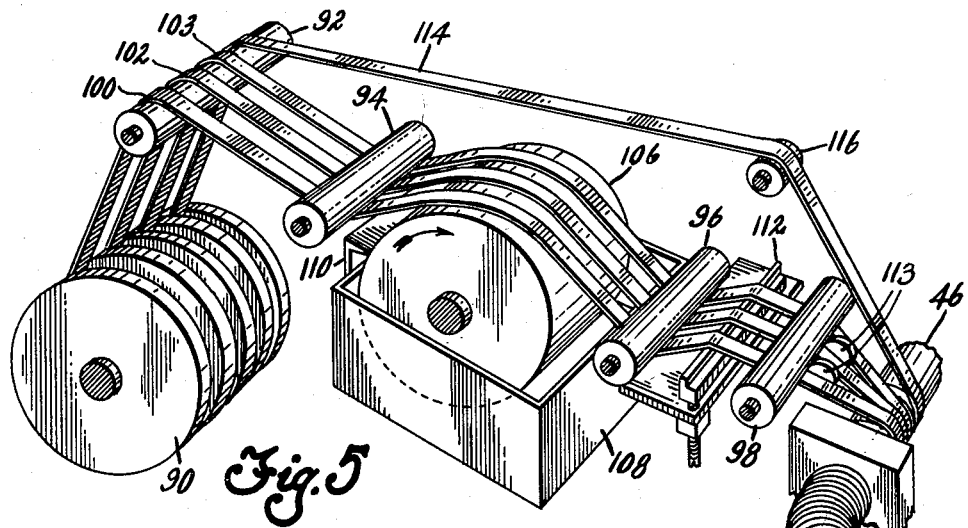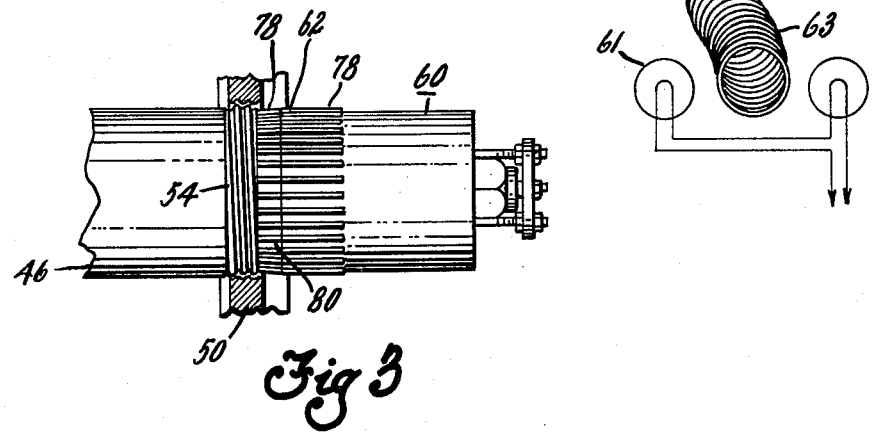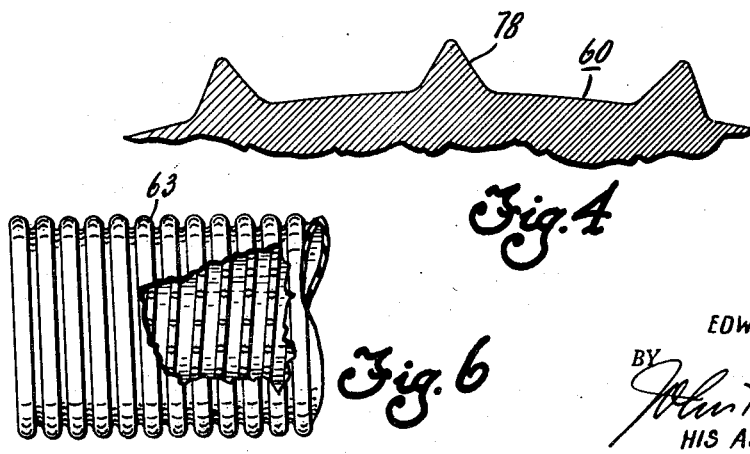

United States Patent Office 2,935,003
Patented May 3, 1960

2,935,003
APPARATUS FOR MAKING TUBING

Edward P. Harris, Dayton, Ohio, assignor to General Motors Corporation, Detroit, Mich., a corporation of Delaware Application February 13, 1956, Serial No. 565,161

1 Claim. (Cl. 93—80)

This invention relates to a method and apparatus for making corrugated flexible tubing and is particularly concerned with a method and apparatus for making flexible tubing from fibrous tape material.

It is therefore one of the main objections of the invention to provide a method and apparatus for making a corrugated flexible tube from a fibrous tape material such as a paper tape.

In carrying out this object it is a further object of the invention to provide a method and apparatus for making such a tube continuously.

Another object of the invention is to provide a method and apparatus for making a corrugated flexible tube from fibrous tape material wherein the diameter of the tube is maintained substantially constant and wherein the number of corrugations per unit length may be varied during continuous operation of the device.

A still further object of the invention is to provide a method and apparatus for making a corrugated flexible tube from fibrous tape material wherein the tape material is wound spirally upon a mandrel to form a tube after which the tube passes through a die that threads the tube by deforming the same to form corrugations and finally wherein the tube is drawn from the die by means of a rotating mandrel wherein the number of corrugations per unit length of the tube may be varied by varying the diameter of the mandrel.

Further objects and advantages of the present invention will be apparent from the following description, reference being had to the accompanying drawings wherein a preferred form of the invention is clearly shown.

In the drawings:

Figure 1 is a view in cross section of the tube forming portion of the apparatus;

Figure 2 is an enlarged fragmentary view in cross section of a section taken on line 2—2 of Figure 1;

Figure 3 is a fragmentary elevation taken in the direction of the arrows 3—3 in Figure 1;

Figure 4 is an enlarged fragmentary view in cross section taken on line 4—4 of Figure 1;

Figure 5 is a diagrammatic view of the supply apparatus for the machine showing the tapes and apparatus for preparing the tapes prior to winding the same to form a tube; and Figure 6 is a portion of a tube as formed on the apparatus shown in Figure 1, partly in section.

Corrugated tubing is highly flexible and is quite useful, for example in air hose applications. This tubing is formed from a plurality of materials and in many cases is made from fabric tape, skin coated with rubber. This tubing, due to the relatively low strength and rigidity of the fabric tape, requires a reinforcing wire embedded therein in order to maintain the shape of the tubing. Tubing of this character together with a machine for making such tubing is clearly shown in Patent No. 2,615,491, assigned to the assignee of the present invention. Another machine and method for making tubing of this character is shown in Patent No. 2,489,503, also assigned to the assignee of the present invention. In both of these patents, as hereinbefore explained, the tubing is reinforced with a wire to strengthen the same and to resist collapse of the tube.

It has been found that fibrous material such as paper makes excellent flexible tubing for many uses such as defroster hose, for example, wherein the paper is impregnated or stiffened with a rubber composition, asphalt, resinous impregnants, etc., and wherein the tubing is highly corrugated to form a spiral integral reinforcement therein. In other words, due to the corrugations, the tubing resists collapse and is highly suitable for many uses wherein the tubing after installation is not handled to any great extent nor flexed repeatedly.

The art of making corrugated paper tubing is not new and in fact is quite well developed, but in each and every case the method of manufacture and the apparatus used to manufacture the tubing present problems which are difficult to overcome and which have for the most part reduced the use of paper tubing due to cost and difficulty in producing uniform tubing of high quality.

The present invention is directed to a machine and method for making such tubing wherein the tube is uniform in character, may be made continuously and wherein the machine and method present an inexpensive production operation that produces tubing that is economically useful.

In the main, the difference between the machine and method herein disclosed and the machines and method of the prior art is directed to the relative movements of the dies and mandrels used in the manufacture of the tubing. In prior art devices the reels carrying the paper tapes, etc., revolved about a fixed mandrel to form the tube and the dies which corrugated this tube turned and formed a thread therein which thread acted as a continuous corrugation in the tube.

The present machine and method utilizes reels for the tapes which do not revolve, a mandrel which does revolve, and dies that are stationary. Furthermore, a second mandrel provided at the exit end of the forming dies acts as a turning and pulling means and simultaneously a sizing means for the tubing that is formed while also permitting varied regulation of the number of corrugations per unit length of the tube through adjustment of the diameter of said mandrel.

The tubing formed, which is sufficiently flexible to permit a 180° bend around its own diameter, will withstand normal temperatures up to 212° F., will withstand normal low temperatures down to —20° F. while being flexible at these extreme temperatures without cracking and will have a relatively low water absorption due to the impregnant materials used in the tape. This type of corrugated hose or tube also has good flow characteristics when compared with other types of corrugated or flexible tube.

Referring specifically to the drawings, Figure 1 shows a cross sectional view of the tube wrapping apparatus at 20 wherein a base 22 supports two uprights 24 and 26 at one end thereof which act as journals for a pair of shafts 30 and 32. The shaft 32 is rotatable and has keyed thereto a pair of gears 34 and 36 and a pulley 38 which obtains power from a motor, not shown. The gears 34 and 36 mesh with gears 40 and 42 respectively. Gear 42 is rotatably journaled on the shaft 30 which is stationary while gear 40 is keyed to a concentric shaft 43 which passes through the stationary shaft 30. A rotatable mandrel 46 is journaled on the stationary shaft 30 and is fixedly keyed to the gear 42. The gears 34, 36, 40 and 42 are preferably of equal pitch and diameter, so as the shaft 32 is turned the gears 34 and 36 turn the shaft 43 and the mandrel 46 at the same rate.

A support 44 at the other end of base 22 carries a stationary female die member 50 which is held thereto by suitable means such as a ring 52 held thereagainst by a plurality of bolts 53. A second stationary die 54 is threadably engaged to and is carried by the stationary shaft 30 in concentric arrangement with the die 50. These dies are preferably of a double or triple lead type although this is a matter of choice.

Carried on the outer end of shaft 43 and splined thereto is an expansible mandrel 60. The mandrel 60 includes a split end portion 62 thereon which is formed by cutting a plurality of slots axially thereof in a manner similar to a collett for forming fingers. Internally of the split end portion 62 is a tapered surface 64 which cooperates with a tapered plug 66. Plug 66 is held to a longitudinally extending shaft 68 by means of a plurality of bolts 70 one of which is shown. The shaft 68 extends through shaft 43 and cooperates with a hand wheel 72 which may be threaded in and out of a support 74. As the hand wheel is threaded in, the plug 66 is drawn inwardly against the tapered surfaces of the mandrel 60 to expand the end portion 62 whereas rotation in the opposite direction causes the plug 66 to move to the left to cause the diameter of the mandrel 60 to decrease at the external diameter thereof due to the inherent springiness of the fingers which tend to assume their normal position.

It will also be noted in Figures 3 and 4 that the external surface of the mandrel 60 adjacent the end 62 thereof is outwardly splined as at 78. These splines extend a portion of the way down the mandrel 60 and act as means for preventing the tube, which is forced thereon, from turning relative to the mandrel as will be explained hereinafter.

Referring again to Figure 1, it will be noted that a plate 80 is also splined to the shaft 43 which plate has complementary splines 78 thereon. This plate acts as a journal against the stationary die member 54 and also is tapered inwardly so that the mandrel 60 will more readily accept the tube as it passes thereon. The portions of the spline 78 carried by the plate 80 have a diameter less than the diameter of the portion of the splines carried by the main portion of the mandrel 60 and are aligned therewith. In practice the outer diameter of the splines 78 is at least equal to and is preferably slightly greater than the diameter of mandrel 46. This causes an axial compression of the tube which will determine the number of convolutions per unit length.

Referring to Figure 5 the apparatus for supplying tape to the mandrel 46 is shown diagrammatically. This includes a plurality of reels of tape 90 together with rollers 92, 94, 96 and 98. A plurality of tapes are preferably used and in Figure 5 four such tapes are shown. Three of the tapes, namely tapes 100, 102 and 103 pass over the roller 92, under the roller 94 and across an adhesive supply roller 106 which rotates in a pan 108 containing adhesive. The pan is supplied with a scraper 110 to remove excess adhesive therefrom. As the tapes 100, 102 and 103 pass over the roller 106, adhesive is transferred to the lower surfaces thereof. These three tapes then pass under the roller 96 and over scraper 112 which removes excessive adhesive therefrom, under the roller 98 and then are wound spirally upon the mandrel 46. These tapes simultaneously are overlapped. The spacing between the tapes is maintained by a plurality of guides or guide rollers 113. One tape, namely tape 114, preferably does not pass over the adhesive supply roller 106 but goes directly from roller 92 to a small guide 116. This tape is the first tape to be wrapped onto the mandrel 46 and has no adhesive thereon. In this connection, if it is desirable to use adhesive on the first tape, care must be taken that none is present on the side of the tape that contacts the mandrel. The remaining tapes 100, 102 and 103 are superimposed thereon and adhere together and to the tape 114. In this manner the tube formed on the mandrel 46 is not adhered thereto and may be removed therefrom, longitudinally thereof.

As the mandrel 46 rotates and the tube is formed thereon, the tube is initially forced manually into the die between the die members 50 and 54 with turning movement. Once the tube has passed through the die members it tends to be self-feeding. As the tube emerges from the die members in corrugated condition, as shown in the enlarged section in Figure 2, it passes over the splined portion of the driving mandrel 60 and the splines are adjustably set to bite into the tube and prevent relative rotation. After this condition has been attained, the mandrel 60 pulls and screws the tube from the mandrel 46 through the die members 50 and 54 and the tube as it is corrugated moves longitudinally of the mandrel 60. By properly adjusting the diameter of the splines 78, it is possible to cause the number of corrugations per inch of the tube to vary whereby the corrugations may be crowded as noted in Figure 2 as they pass onto the splined mandrel which will now have a slightly larger diameter than the mandrel 46. Since the splines are longitudinal of the tube, the tube advances thereover without turning relative thereto and thus, once the machine is started, it is automatic in its operation since the mandrel 60 will pull the spirally formed tube off the mandrel 46 through the dies 50 and 54 and then the tube as it is formed will force progressive portions 63 thereof off the mandrel 60. These portions are then cured by suitable heating means such as infrared lamps shown diagrammatically at 61 in Figure 5.

In this manner a tightly corrugated tube may be formed from a plurality of tapes which are adhered together by a suitable adhesive. The diameter of the hose or tubing may be varied by utilizing different dies and mandrels in the machine and the strength of the tube may be varied by increasing or decreasing the number of paper tapes used to form the tube. In this connection, the tape, which is wrapped in direct contact with the mandrel 46, must not have adhesive on the one side thereof so that the tube form will be easily removed from the mandrel.

In practice, the paper tape used is approximately ¾ of an inch wide and is of a 65 pound asphalt impregnated type. The base used is a ½ inch pitch and the tape adhesive is preferably an air drying latex adhesive such as butadiene styrene copolymer latex containing a resorcinal formaldehyde amine resin. The corrugating is carried out to preferably give 140±10 corrugations per foot in a hose having an inner diameter of about two inches.

In order to speed up the curing or drying of the adhesive, it is preferable to heat the hose as it comes from the machine between infrared lights, for example, by passing the tube therebetween, or the tape may be heated prior to or during the wrapping operation as desired. It is also desirable to lubricate the inside and outside tapes with a silicone oil, for example, or any other suitable material which has lubricating properties such as a suitable wax or other well known lubricants, which facilitates removal of the tube from the mandrels and also facilitates movement of the tubes through the corrugating dies. This may be done in the apparatus as shown in Figure 5 by proper positioning of transfer rolls or by a pair of lubricant feed devices, not shown, one for the mandrel and the other for the formed tube, prior to its entry into the die.

One definite advantage of this type of tubing is its resistance thereof towards unraveling. The tube can be cut at any point. This is in differentiation to wire reinforced hoses which tend to unravel and require special fixtures at the ends thereof in many instances.

It is understood that the adhesive used may be varied widely and may include Bakelite type cements or ordinary air drying rubber type cements of natural, butadiene styrene copolymer or butadiene acrylonitrile copolymer types. When using the Bakelite type of cement it is obvious that the tube will require curing which can be accomplished in a curing oven, in an infrared light heater, as shown, or by other suitable and well known means. The particular adhesive forms no part of this invention nor does the particular paper used. In this connection other types of strip material such as phenol-formaldehyde impregnated paper, metal foils, cloth, polyethelene coated paper, ribbon, etc., may all be used alone or in combination to form tubes of varying characteristics.

It is further comprehended that in place of applying the adhesive directly to the tape material by roller transfer, it may be applied by spraying or dipping, or the adhesive may be used as a separate tape interposed between pairs of paper or cloth tape. In all cases the term "curing" is used in the generic sense and includes drying, polymerizing or other chemical or physical change as is occasioned by the heating step.

The structure and specific materials which go into the tube or hose formed by the method and apparatus disclosed herein are claimed in application S.N. 565,160, filed concurrently herewith which issued as Patent No. 2,884,957.

While the forms of embodiment of the invention as herein disclosed constitute preferred forms, it is to be understood that other forms might be adopted, as may come within the scope of the claim which follows.

What is claimed is as follows:

A machine for forming corrugated flexible tubing from ribbon-like material, comprising in combination; a rotatable mandrel having a diameter substantially equal to the inside diameter of the tube to be ultimately formed thereon, stationary feed means positioned adjacent said mandrel and adapted to carry ribbon-like material which can be wrapped spirally on the mandrel, stationary die means at one end of the mandrel adapted to corrugate tubing made on the mandrel that passes therethrough, a second mandrel rotatable at the same rate of rotation as the first mentioned mandrel immediately adjacent the exit of said die means, said second mandrel including longitudinal splines at the outer surface thereof which present a diameter at least equal to the diameter of the first mentioned mandrel, and means within said second mandrel for expanding the same for increasing the diameter slightly in excess of the diameter of the first mentioned mandrel.

References Cited in the file of this patent
UNITED STATES PATENTS

| | | |
|---|---|---|
| 2,002,896 | Kopetz | May 28, 1935 |
| 2,559,191 | Hussnigg | July 3, 1951 |
| 2,609,319 | Boge | Sept. 2, 1952 |
| 2,631,645 | Friedman | Mar. 17, 1953 |
| 2,657,617 | Hussnigg | Nov. 3, 1953 |
| 2,688,906 | Dokopil | Sept. 14, 1954 |